US008961114B2

(12) United States Patent
Ruthemeyer

(10) Patent No.: US 8,961,114 B2
(45) Date of Patent: Feb. 24, 2015

(54) INTEGRATED VARIABLE GEOMETRY FLOW RESTRICTOR AND HEAT EXCHANGER

(75) Inventor: Michael Anthony Ruthemeyer, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1114 days.

(21) Appl. No.: 12/951,178

(22) Filed: Nov. 22, 2010

(65) Prior Publication Data

US 2012/0128467 A1 May 24, 2012

(51) Int. Cl.
*F01D 25/12* (2006.01)
*F01D 5/14* (2006.01)
*F02C 3/13* (2006.01)
*F02C 7/08* (2006.01)
*F02C 7/14* (2006.01)
(Continued)

(52) U.S. Cl.
CPC ............... *F01D 25/12* (2013.01); *F01D 5/146* (2013.01); *F02C 3/13* (2013.01); *F02C 7/08* (2013.01); *F02C 7/14* (2013.01); *F02C 7/185* (2013.01); *F02K 1/06* (2013.01); *F02K 1/08* (2013.01); *F02K 1/1207* (2013.01); *F02K 3/075* (2013.01); *F28D 11/04* (2013.01); *F28F 1/02* (2013.01); *F28F 13/08* (2013.01); *F01D 5/18* (2013.01); *F01D 17/162* (2013.01); *F01D 17/165* (2013.01); *F02C 7/143* (2013.01); *F02C 9/18* (2013.01); *F05D 2260/56* (2013.01); *Y02T 50/673* (2013.01); *Y02T 50/676* (2013.01)
USPC ............................. 415/145; 415/176; 415/178

(58) Field of Classification Search
CPC .............. F04D 29/464; F04D 29/5826; F04D 29/5833; F01D 5/08; F01D 25/08; F01D 25/12; F01D 25/14
USPC ......... 415/115, 116, 126, 127, 128, 144, 145, 415/175, 176, 177; 60/415; 165/96, 181
See application file for complete search history.

(56) References Cited

U.S. PATENT DOCUMENTS 3,528,250 A * 9/1970 Johnson .......................... 60/762
3,735,588 A * 5/1973 Moskowitz et al. ....... 60/39.511
(Continued)

FOREIGN PATENT DOCUMENTS

CN 1975130 A 6/2007
EP 1256697 A2 11/2002
(Continued)

OTHER PUBLICATIONS

PCT Search Report and Written Opinion dated Feb. 25, 2013 trim corresponding Application No. PCT/US2011/059664.
(Continued)

*Primary Examiner* — Ninh H Nguyen
(74) *Attorney, Agent, or Firm* — General Electric Company; Pamela A. Kachur

(57) ABSTRACT

One or more heat exchangers mounted in a duct have heat transfer cooling passages therein and a variable geometry flow restrictor is integral with each of the heat exchangers. An annular slide valve axially translatable within the duct is operable to open and close or vary a variable area between the heat exchangers and one of inner and outer casings bounding the duct. The heat exchangers may be being circumferentially distributed around an annular duct and include radial or circumferentially curved heat transfer tubes or vanes.

8 Claims, 12 Drawing Sheets

(51) Int. Cl.
   *F02C 7/18*     (2006.01)
   *F02K 1/06*     (2006.01)
   *F02K 1/08*     (2006.01)
   *F02K 1/12*     (2006.01)
   *F02K 3/075*    (2006.01)
   *F28D 11/04*    (2006.01)
   *F28F 1/02*     (2006.01)
   *F28F 13/08*    (2006.01)
   *F01D 5/18*     (2006.01)
   *F01D 17/16*    (2006.01)
   *F02C 7/143*    (2006.01)
   *F02C 9/18*     (2006.01)

(56) References Cited

U.S. PATENT DOCUMENTS

| | | | |
|---|---|---|---|
| 4,010,608 A | 3/1977 | Simmons | |
| 4,064,692 A | 12/1977 | Johnson et al. | |
| 4,068,471 A | 1/1978 | Simmons | |
| 4,069,661 A | 1/1978 | Rundell et al. | |
| 4,072,008 A | 2/1978 | Kenworth et al. | |
| 4,080,785 A | 3/1978 | Koff et al. | |
| 4,175,384 A | 11/1979 | Wagenknecht et al. | |
| 4,187,675 A | 2/1980 | Wakeman | |
| 4,222,233 A | 9/1980 | Johnson et al. | |
| 4,292,802 A | 10/1981 | Snow | |
| 4,409,788 A | 10/1983 | Nash et al. | |
| 5,259,187 A | 11/1993 | Dunbar et al. | |
| 5,269,133 A | 12/1993 | Wallace | |
| 5,307,624 A | 5/1994 | Even-Nur et al. | |
| 5,343,697 A | 9/1994 | Johnson et al. | |
| 5,417,056 A | 5/1995 | Johnson et al. | |
| 5,694,767 A | 12/1997 | Vdoviak et al. | |
| 7,758,303 B1 | 7/2010 | Wadia et al. | |
| 7,765,789 B2 | 8/2010 | Johnson | |
| 7,810,312 B2 | 10/2010 | Stretton et al. | |
| 2008/0028763 A1 | 2/2008 | Schwarz et al. | |
| 2008/0190095 A1 | 8/2008 | Baran | |
| 2008/0314573 A1 | 12/2008 | Schwarz et al. | |
| 2008/0317587 A1 | 12/2008 | Lord et al. | |
| 2009/0016874 A1 | 1/2009 | Corsmeier et al. | |
| 2009/0035127 A1 * | 2/2009 | Corsmeier | 415/145 |
| 2009/0211090 A1 | 8/2009 | Corsmeier et al. | |
| 2009/0317238 A1 | 12/2009 | Wood et al. | |
| 2010/0058769 A1 | 3/2010 | Baran | |
| 2010/0126139 A1 | 5/2010 | Howe | |
| 2010/0196147 A1 | 8/2010 | Schilling | |

FOREIGN PATENT DOCUMENTS

| | | | |
|---|---|---|---|
| EP | 1589204 A2 | 10/2005 | |
| EP | 1835128 A2 * | 9/2007 | F01D 5/04 |
| EP | 1876328 A2 | 1/2008 | |
| EP | 1944475 A2 * | 7/2008 | F01D 25/12 |
| GB | 2019500 A | 10/1979 | |
| GB | 2210935 A | 6/1989 | |
| WO | WO 02/38938 A1 | 5/2002 | |

OTHER PUBLICATIONS

CN Office Action dated Nov. 3, 2014 from corresponding Application No. 201180056087.9.

\* cited by examiner

INTEGRATED VARIABLE GEOMETRY FLOW RESTRICTOR AND HEAT EXCHANGER

BACKGROUND OF THE INVENTION

1. Technical Field

The present invention relates generally to heat exchangers in turbofan gas turbine engines and, more specifically, to heat exchangers and regulating flow in fan bypass ducts of the engines.

2. Background Information

At least some known aircraft gas turbine engines include a fan, a compressor, a combustor, a high pressure turbine, a low pressure turbine, and an augmentor or "afterburner" and an exhaust nozzle. The compressor, combustor, high pressure turbine, and low pressure turbine are collectively referred to as a core engine or engine core.

Airflow entering the fan is compressed. Airflow exiting the fan is split such that a portion of the flow referred to as core engine flow is directed into the compressor and the remaining portion of the airflow, referred to as fan bypass flow, is directed into a bypass duct or passage where it bypasses the compressor, the combustor, the high pressure turbine, and the low pressure turbine. Airflow entering the compressor is compressed and directed to the combustor where it is mixed with fuel and ignited, producing hot combustion gases used to drive both the high pressure and the low pressure turbines. Moreover, at least some known gas turbine engines combine a portion of the fan bypass flow with the airflow exiting the low pressure turbine forming an exhaust flow. The exhaust flow may be further heated in the augmentor before exiting through the exhaust nozzle.

Variable cycle or variable bypass gas turbine engines have been designed to combine high thrust capabilities of turbojets with good fuel efficiency of turbofan engines. Typically in variable cycle engines, the amount of air that is bypassed is changed to suit aircraft speed.

The bypass air is often modulated or regulated by various devices for various reasons. To regulate an amount of bypass air supplied to the augmentor, at least some gas turbine engines include a valve assembly. More specifically, in some known gas turbine engines, the fan bypass flow is regulated based on specific exhaust liner pressure ratio requirements demanded for the type of flight mode of the aircraft.

Variable cycle systems have been considered for use in typical military engines that use augmentors (afterburners) to provide additional thrust at supersonic speeds. Afterburning turbofan engines typically utilize mixers that take part of the engine's bypass air and mix or inject that air into the core engine flow in an engine's afterburning section. Typically, it is desirable to increase the total bypass flow at dry operating conditions and to reduce the bypass flow at augmented conditions. Under dry conditions, the object is to improve specific fuel consumption and during augmented conditions, the object is to improve thrust.

Rear Variable Area Bypass Injectors (rear VABI's) are used to inject the bypass air at the afterburner and forward Variable Area Bypass Injectors (forward VABI's) are used to inject or control bypass air flowing into the fan bypass duct. Some examples of such VABI's are described in various U.S. patents including U.S. Pat. No. 4,069,661; U.S. Pat. No. 4,064,692; U.S. Pat. No. 4,072,008; U.S. Pat. No. 4,010,608; U.S. Pat. No. 4,068,471, and U.S. Pat. No. 4,175,384.

VABI's and other types of valves used to regulate an amount of bypass air supplied to the augmentor may include a plurality of adjustable or variable blocker doors or variable vanes. Variable vanes disposed in fan ducts of aircraft high bypass gas turbine engines and FLADE engines are two examples of such an apparatus. U.S. Pat. No. 7,758,303, issued Jul. 10, 2010, entitled "FLADE Fan With Different Inner And Outer Airfoil Stagger Angles At A Shroud Therebetween" discloses a variable FLADE inlet guide vanes disposed in a FLADE duct which surrounds a core engine. U.S. Pat. No. 4,080,785, issued Mar. 28, 1978, entitled "Modulating bypass variable cycle turbofan engine" discloses flaps at downstream ends of fan bypass ducts for variable area fan nozzles. U.S. Pat. No. 7,721,549, issued May 25, 2010, entitled "Fan variable area nozzle for a gas turbine engine fan nacelle with cam drive ring actuation system" discloses a fan variable area nozzle including a flap assembly which varies a fan nozzle exit area. U.S. Pat. No. 4,292,802, issued Oct. 6, 1981, entitled "Method and apparatus for increasing compressor inlet pressure" discloses a plurality of blocker door vanes disposed in the bypass duct to selectively close off the bypass flow and increase the flow and pressure of the air flowing into the compressor.

Two regulating valves are disclosed in U.S. patent application Ser. No. 11/753,929, filed May 25, 2007, entitled "METHOD AND APPARATUS FOR REGULATING FLUID FLOW THROUGH A TURBINE ENGINE" and Ser. No. 11/753,907, filed May 25, 2007, entitled "TURBINE ENGINE VALVE ASSEMBLY AND METHOD OF ASSEMBLING THE SAME". These regulating valves includes an outer fairing coupled to a radially outer duct wall, an inner fairing coupled to a radially inner duct wall, and a translatable annular slide valve. The annular slide valve is selectively positioned between the fairings such that at least one flow area between the slide valve and the fairings is varied. The VABI's, variable vanes, and other types of valves are referred to herein as variable geometry flow restrictor.

Modern gas turbine engines and variable cycle engines require cooling air or other fluids for the hot components such as turbine components and aircraft avionics. Other type of heat exchangers found in gas turbine engines are used for cooling oil, fuel and water. This cooling air or fluid often requires a heat exchanger to transfer energy into the bypass of the engine and the heat exchanger is often located in the bypass duct or uses bypass duct airflow. Variable cycle engines can provide large efficiency and performance boosts over a large range of power requirements. The VABI's and blockers, generally referred to herein as bypass valves, have been developed for turbofan aircraft engines to take advantage of these benefits.

Heat exchangers in the bypass duct and bypass valves often conflict with one another, especially if they use the same air. Heat exchangers restrict airflow and hurt the engine performance benefit of a variable geometry engine (an engine using bypass valves). Variable geometry often restricts the heat exchangers flow when it is needed most.

Accordingly, it is desired to provide a gas turbine engine having a heat exchanger cooled by fan bypass flow and a bypass valve for regulating or restricting the fan bypass flow. It is further desired to have low or reduced performance conflicts between the heat exchanger and bypass valve.

BRIEF DESCRIPTION OF THE INVENTION

An integrated variable geometry flow restrictor and heat exchanger system includes one or more heat exchangers mounted in a duct, heat transfer cooling passages in each of the heat exchangers, and a variable geometry flow restrictor integral with each of the heat exchangers.

The system may further include a variable area between the heat exchangers and one of inner and outer casings bounding the duct and an annular slide valve axially translatable within the duct and with respect to the heat exchanger and operable to open and close or vary the variable area. The heat exchangers may be mounted to one of the inner and outer casings. The duct may be annular, circumscribed about a longitudinal centerline, and the heat exchangers circumferentially distributed around the duct. The heat exchangers may include radial or circumferentially curved heat transfer tubes or vanes.

The heat exchangers may include an annular upstream row of tube and fin heat exchangers rotatable and/or axially translatable with respect to an annular downstream row of tube and fin heat exchangers. The annular upstream and downstream rows of tube and fin heat exchangers further include radially extending upstream and downstream heat transfer tubes respectively. The annular upstream and downstream rows of tube and fin heat exchangers operate as the variable geometry flow restrictor for opening and closing a variable area between the upstream and downstream heat transfer tubes. The duct may be annular and circumscribed about a longitudinal centerline and the annular upstream and downstream rows of tube and fin heat exchangers may be annular segments disposed about the longitudinal centerline.

The heat exchangers may further include an annular array of hollow vanes and the variable geometry flow restrictor may include variable leading edge tips for opening and closing a variable area between the hollow vanes.

A gas turbine engine circumscribed about a longitudinal centerline includes an annular inlet followed in axial downstream flow relationship by a fan assembly, a high pressure compressor, a combustor, a high pressure turbine, and a low pressure turbine. An outer casing radially spaced apart from an inner casing define a bypass duct therebetween. The bypass duct is located around and radially outwardly of the high pressure compressor, the combustor, the high pressure turbine, and the low pressure turbine. An integrated variable geometry flow restrictor and heat exchanger system includes one or more heat exchangers mounted in the duct and a variable geometry flow restrictor integral with the heat exchangers. Heat transfer cooling passages are in each of the heat exchangers.

The variable geometry flow restrictor may include at least one slide valve assembly disposed in the bypass duct and the heat transfer cooling passages may be carried by one or more components of the slide valve assembly. The components of the slide valve assembly may include at least one of inner and outer fairings and an axially translatable annular slide valve within the bypass duct. The slide valve is operable to open and close or vary the variable area which is bounded by the one of the inner and outer fairings.

The variable area may include an inner bypass cross-sectional area between the slide valve and the inner fairing and an outer bypass cross-sectional area between the slide valve and the outer fairing. An annular slide valve axially translatable within the bypass duct and with respect to the heat exchanger is operable to open and close or vary a variable area between the heat exchanger and one of inner and outer casings bounding the bypass duct.

A gas turbine engine may have a fan with a longitudinally aft-most row of generally radially outwardly extending fan blades and the bypass duct extends axially aftwardly and downstream from the fan to a fan nozzle at a longitudinally aft end of the fan bypass duct. An annular row of hollow variable-pitch fan outlet guide vanes are radially disposed across the fan bypass duct longitudinally aft of the fan. The heat transfer cooling passages include the hollow variable-pitch fan outlet guide vanes operable for passing cooling air therethrough and the variable geometry flow restrictor includes the hollow variable-pitch fan outlet guide vanes being pivotable about pivot axes normal to the engine centerline. Vane leading or trailing edges of the variable-pitch fan outlet guide vanes may be pivotable.

A gas turbine engine may include a fan having a longitudinally aft-most row of generally radially outwardly extending fan blades in the fan assembly, a bypass duct extending axially aftwardly and downstream from the fan to a fan nozzle at a longitudinally aft end of the fan bypass duct, a variable geometry flow restrictor including a circumferential row of pivotal flaps disposed in the fan nozzle, and heat transfer cooling passages carried by the circumferential row of pivotal flaps.

A gas turbine engine may have a variable area exhaust nozzle axially aft and downstream of the low pressure turbine, an exhaust flow path radially surrounded by the inner casing and extending downstream from the low pressure turbine, and a variable area bypass injector generally radially located between the bypass duct and the exhaust flow path and axially located aft and downstream of the low pressure turbine. A variable geometry flow restrictor of the variable area bypass injector includes a slider valve operable to selectively cover one or more openings in the inner casing between the bypass duct and the exhaust flow path and the heat transfer cooling passages include one or more heat transfer tubes disposed in each of the openings. Impingement holes or slots in the slider valve may be aimed to direct an injection portion of fan bypass flow in the bypass duct to impinge directly onto the heat transfer tubes when the slider valve is in a closed position.

DETAILED DESCRIPTION OF THE INVENTION

Figure 1:
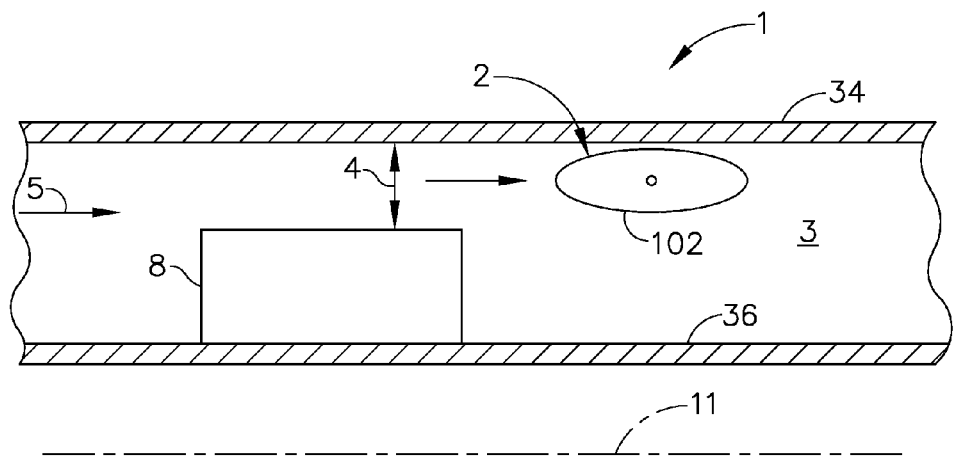
FIG. 1 is an axial diagrammatical view illustration of an integrated variable geometry flow restrictor and heat exchanger system in a gas turbine engine fan bypass duct with the restrictor in an open position.
Figure 2:
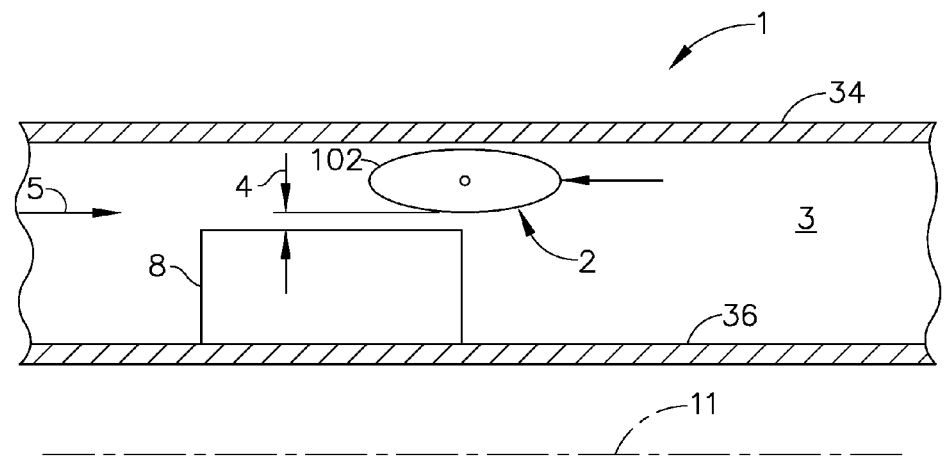
FIG. 2 is an axial sectional diagrammatical view illustration of the system illustrated in FIG. 1 with the restrictor in a closed position.

An integrated variable geometry flow restrictor and heat exchanger system 1 in a gas turbine engine annular fan bypass duct 3 circumscribed about a longitudinal centerline 11 is illustrated in FIGS. 1 and 2. An outer casing 34 radially spaced apart from an inner casing 36 bounds the fan bypass duct 3. The integrated variable geometry flow restrictor and heat exchanger system 1 illustrated in FIGS. 1 and 2 includes a heat exchanger 8 integral and in parallel flow relationship with a variable geometry flow restrictor 2.

The heat exchanger 8 is illustrated herein as being mounted on the inner casing 36 but alternatively may be mounted on the outer casing 34 or radially between the casings. The variable geometry flow restrictor 2 is illustrated in an open position in FIG. 1 and in a closed position in FIG. 2. The flow restrictor 2 is illustrated as including an annular slide valve 102 axially translatable with respect to the heat exchanger 8 and operable to open and close or vary a variable area 4 between the heat exchanger 8 and the outer casing 34 in the bypass duct 3.

The heat exchangers 8 illustrated herein are air to air heat exchangers to cool cooling air. Other type of air to fluid heat exchangers are contemplated. Such air to fluid heat exchangers include heat exchangers used for cooling oil, fuel and water.

The heat exchanger 8 provides good heat transfer performance tailored to the needs of engine components cooled by the heat exchanger at both high and low bypass operation. The high and low bypass operation corresponds to the flow restrictor 2 being in opened and closed positions as illustrated in FIGS. 1 and 2 respectively. The heat exchanger 8 also does not overly restricts bypass flow 5 in the bypass duct 3 during low power and high bypass flight operating conditions of the engine, thus, allowing for larger bypass ratios, higher thrust, and better SFC as compared to previous designs.

A heat exchanger's effectiveness will vary when placed in series with a flow control device (i.e. variable bypass area injector or flow restrictor) as is done in the prior art. The heat exchanging effectiveness is often low when the bypass ratio is low and high when the bypass ratio is high in variable bypass variable cycle engines. Engine performance reacts in the opposite manner because of high-pressure loss at high flow. This results in a trade-off being made by designers with respect to heat exchanger effectiveness vs. engine performance.

When the engine is at high power, the fan bypass flow is often restricted. At high power, the engine and aircraft need the most cooling and the heat exchanger's performance is low because of low fan bypass flow. At low power, the cooling requirements are minimal but the heat exchanger acts as a large resistor in the bypass flow and acts to reduce engine thrust and performance. The integrated variable geometry flow restrictor and heat exchanger system 1 in a gas turbine engine annular fan bypass duct 3 disclosed herein avoids these consequences because the variable geometry flow restrictor and heat exchanger are in parallel flow relationship with the bypass flow 5 in the fan bypass duct 3.

Figure 3:
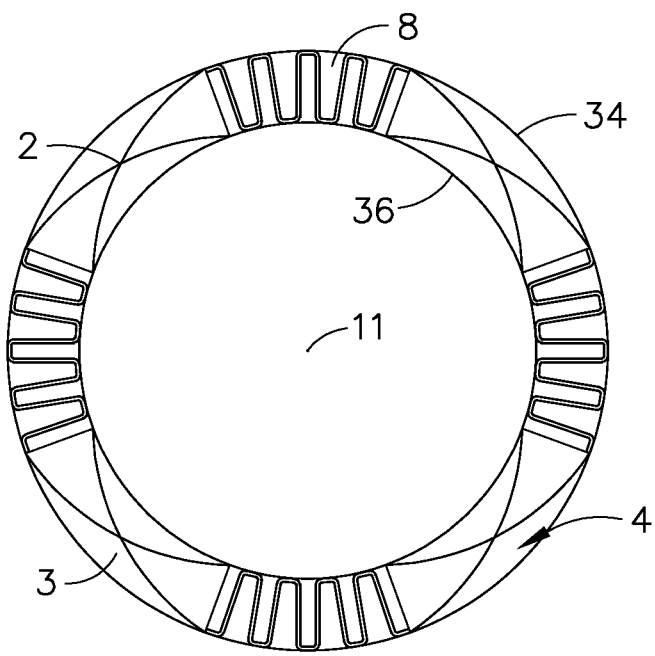
FIG. 3 is an axial sectional diagrammatical view illustration of a segmented integrated variable geometry flow restrictor and heat exchanger system in a gas turbine engine fan bypass duct.
Figure 3A:
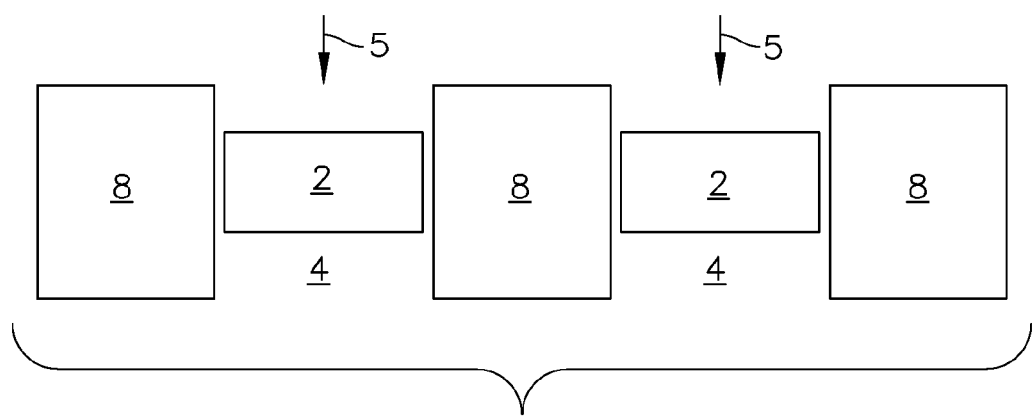
FIG. 3A is a diagrammatical planform view illustration of the segmented integrated variable geometry flow restrictor and heat exchanger system illustrated in FIG. 3.

Illustrated in FIGS. 3 and 3A is an exemplary circumferential distribution or arrangement of four heat exchangers 8 and four variable geometry flow restrictors 2 that may be used in the gas turbine engine annular fan bypass duct 3 for the integrated variable geometry flow restrictor and heat exchanger system 1 described above. The heat exchangers 8 and the variable geometry flow restrictors 2 are shaped in annular segments. Each of the annular variable geometry flow restrictors 2 is circumferentially disposed between two circumferentially adjacent heat exchangers 8. The variable geometry flow restrictors 2 operable to open and close or vary a variable area 4 between the heat exchanger 8 and the outer casing 34 in the bypass duct 3.

Figure 4:
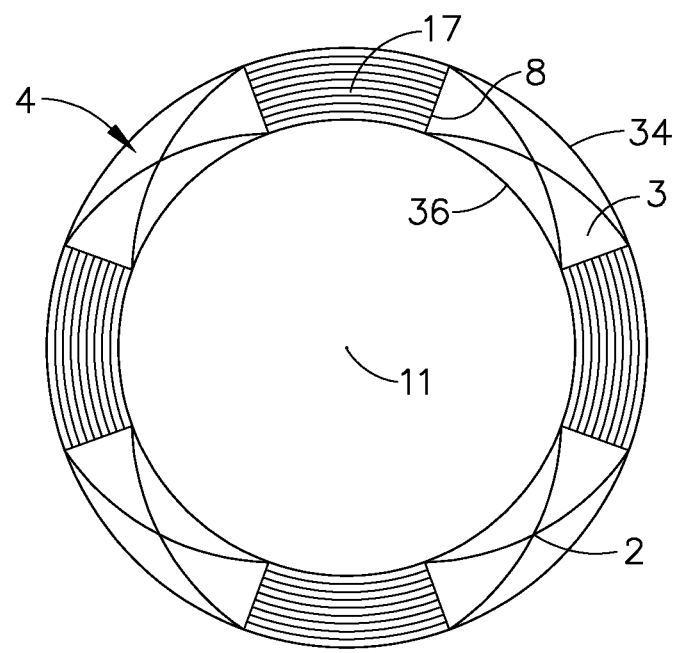
FIG. 4 is an axial sectional diagrammatical view illustration of a heat exchanger illustrated in FIG. 4 with radial heat transfer tubes or vanes.
Figure 5:
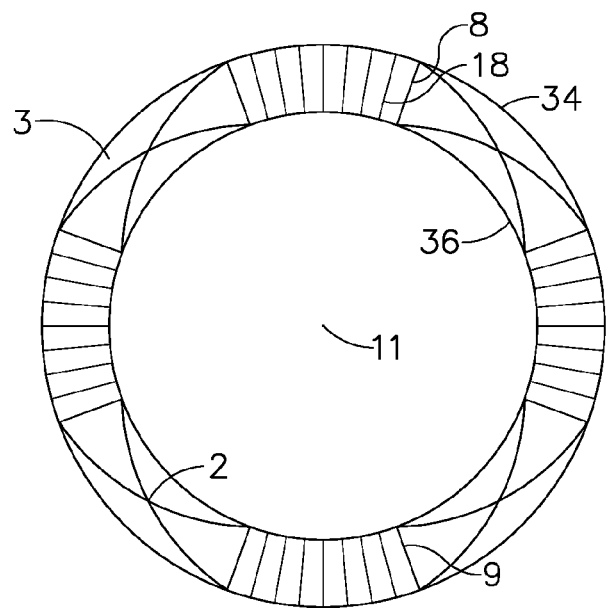
FIG. 5 is an axial sectional diagrammatical view illustration of a heat exchanger illustrated in FIG. 4 with radial heat transfer tubes or vanes.

Two exemplary embodiments of the heat exchangers include circumferentially curved heat transfer tubes 6 or vanes used for heat transfer in the heat exchangers 8 as illustrated in FIG. 4 and radial heat transfer tubes 7 or vanes as illustrated in FIG. 5. The tubes illustrated herein are only examples of heat transfer cooling passages 9 that may be used in the heat exchangers 8.

Figure 6:
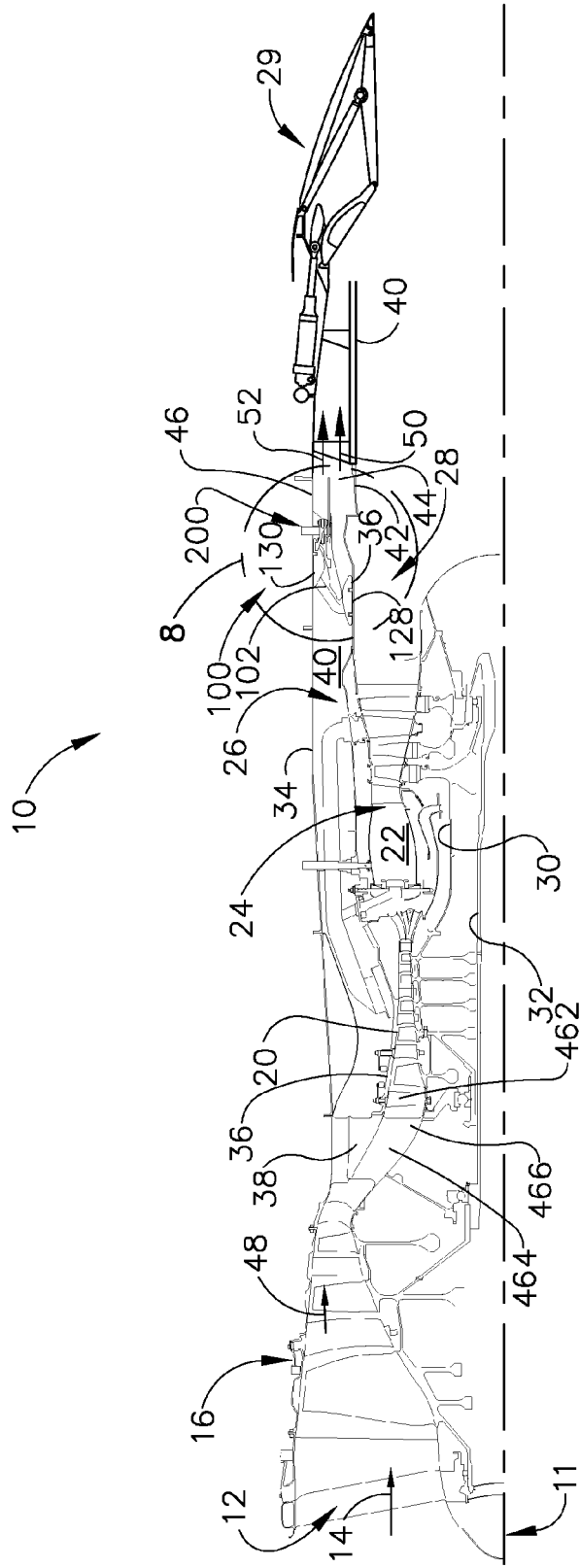
FIG. 6 is an axial sectional schematic view illustration of an exemplary variable cycle turbine engine with a first exemplary embodiment of the integrated variable geometry flow restrictor and heat exchanger system illustrated in FIG. 1.
Figure 7:
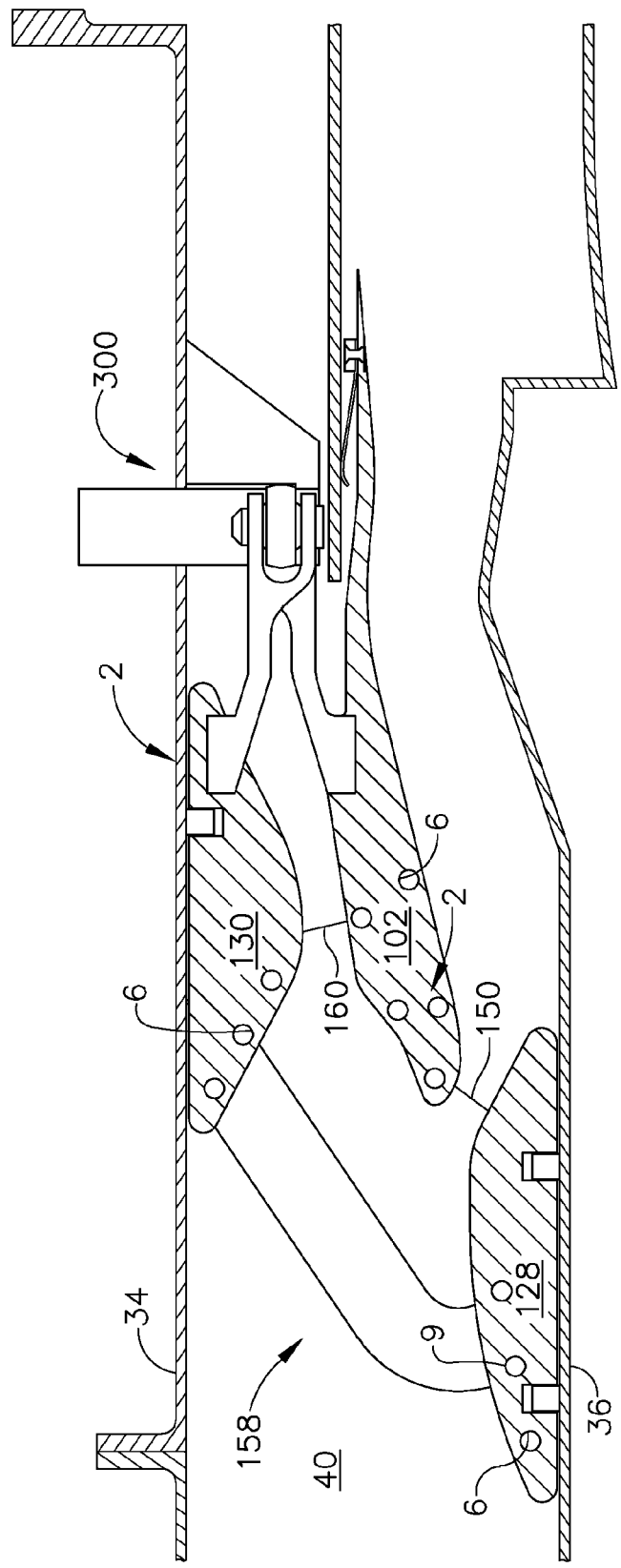
FIG. 7 is an enlarged axial sectional schematic view illustration of the integrated variable geometry flow restrictor and heat exchanger system illustrated in FIG. 6 in an open position.

Illustrated in FIGS. 6 and 7 is an exemplary variable cycle gas turbine engine 10 having a longitudinal centerline 11. The engine 10 includes an annular inlet 12 for receiving ambient air 14 followed in axial downstream flow relationship by a fan assembly 16, a high pressure compressor (HPC) 20, a combustor 22, a high pressure turbine (HPT) 24, a low pressure turbine (LPT) 26, an augmentor 28, and variable area exhaust nozzle 29. The HPT 24 powers the HPC 20 through a first shaft 30. The LPT 26 powers the fan assembly 16 by a second shaft 32. Engine 10 further includes an outer casing 34 which is radially spaced apart from an inner casing 36 including a forward section 38 of inner casing 36 defining a bypass duct 40 therebetween. The augmentor 28 includes a liner 42.

At least one slide valve assembly 100 disposed in the bypass duct 40 serves as the variable geometry flow restrictor. One or more components of the valve assembly 100 carry heat exchanger heat transfer tubes 6 and, thus, serve as the heat exchanger 8 in the integrated variable geometry flow restrictor and heat exchanger system 1. Specifically, engine 10 includes a plurality of valve assemblies 100 positioned circumferentially within duct 40. More specifically, the valve assembly 100 is positioned to facilitate separating bypass duct 40 into a radially inner bypass duct 44 and a radially outer bypass duct 46.

In the exemplary embodiment of the engine 10, fan bypass flow 48 entering bypass duct 40 is divided into an inner air flow 50 and an outer air flow 52. The valve assembly 100 facilitates regulating the amount of inner air flow 50 that is channeled through inner bypass duct 44 and the amount of outer air flow 52 that is channeled through outer bypass duct 46. The engine and its operation are described in more detail in U.S. patent application Ser. No. 11/753,907, by Donald Michael Corsmeier et al., filed May 25, 2007, entitled "TURBINE ENGINE VALVE ASSEMBLY AND METHOD OF ASSEMBLING THE SAME", assigned to the General Electric Company, the assignee of this patent, and hereby incorporated by reference.

Referring further to FIG. 7, components of the valve assembly 100 illustrated herein include an annular slide valve 102 that is slidably coupled within bypass duct 40 via an exemplary crank assembly 200. Slide valve 102 includes a radially inner surface 108 and a radially outer surface 110. The radially inner surface 108 converges gradually from a valve forward end referred to herein as a valve nose 112 in a downstream direction or aftwardly. The radially outer surface 110 converges gradually from the valve nose 112 in a downstream direction or aftwardly. The valve nose 112 is shaped to facilitate splitting fan bypass flow 48 while reducing its separation.

Valve assembly 100 includes an inner fairing 128 and an outer fairing 130 that is positioned downstream from inner fairing 128. The outer fairing 130 is positioned proximate radially outer casing 34 and inner fairing 128 is positioned proximate radially inner casing 36. One or more of the slide valve 102 and inner and outer fairings 128, 130 carry the heat exchanger heat transfer tubes 6 which denote a heat exchanger 8. All three components are illustrated herein as carrying the heat exchanger heat transfer tubes 6 and, thus, serving as a variable geometry flow restrictor 2.

In the exemplary embodiment, outer fairing 130 and inner fairing 128 are coupled together via a strut 158 and translate axially together between outer casing 34 and inner casing 36. The annular slide valve 102 extends between inner fairing 128 and outer fairing 130. Moreover, in the exemplary embodiment, inner fairing 128 and outer fairing 130 are each contoured such that inner bypass duct 44 and outer bypass duct 46 each have variable cross-sectional areas.

Figure 8:
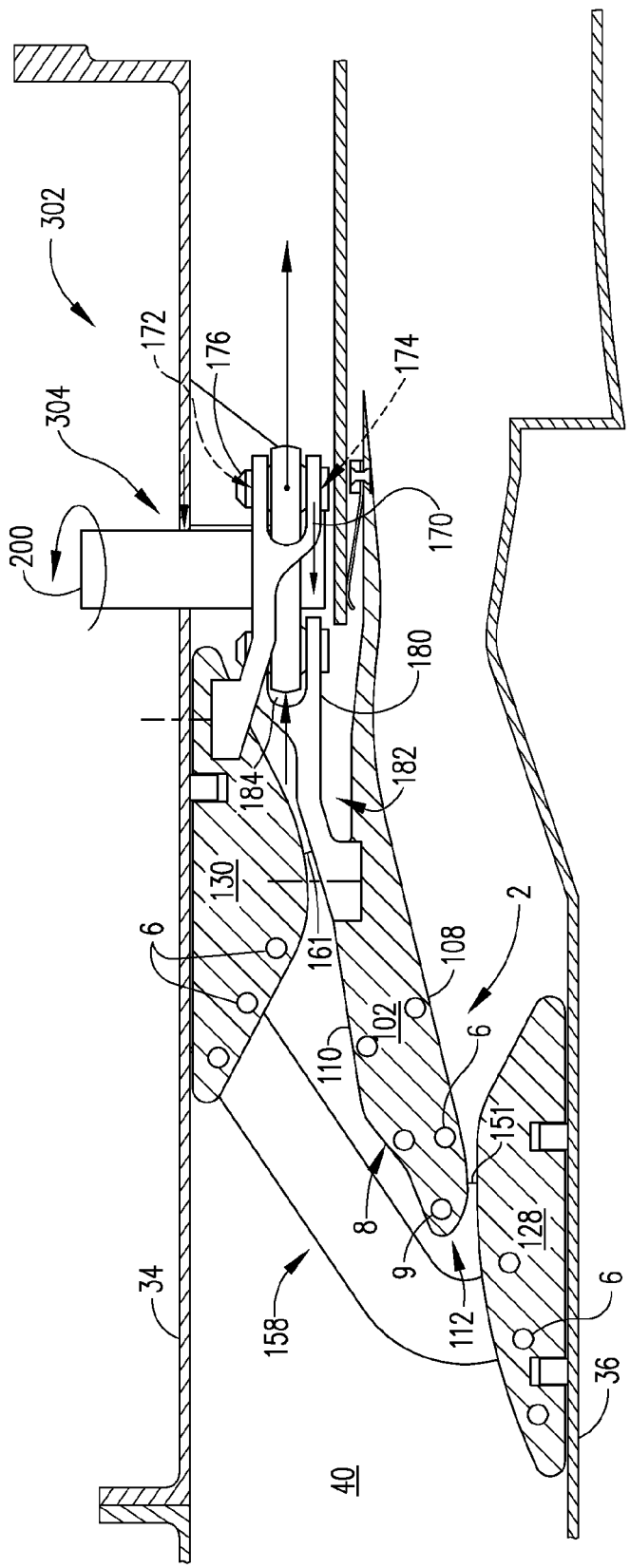
FIG. 8 is an enlarged axial sectional schematic view illustration of the integrated variable geometry flow restrictor and heat exchanger system illustrated in FIG. 6 in a closed position.

The inner and outer fairings 128, 130 are operable to slide substantially simultaneously within the bypass duct 40. The valve assembly 100 is coupled to at least one crank assembly 200 which controls the axial translation of the slide valve 102, outer fairing 130, inner fairing 128, and strut 158. The crank assembly 200 moves slide valve 102, and inner and outer fairings 128, 130 between first and second operational positions 300, 302. The first and second operational positions 300, 302 correspond to the variable geometry flow restrictor being opened and closed as illustrated in FIGS. 7 and 8 respectively.

When the valve assembly 100 is in the first position 300, an inner bypass cross-sectional area 150 is defined between valve 102 and inner fairing 128, and an outer bypass cross-sectional area 160 is defined between valve 102 and outer fairing 130. The valve 102 is in a first operational position, such that substantially all of fan bypass flow 48 is channeled downstream into the inner bypass duct 44 and the outer bypass duct 46. The fan bypass flow 48 is separated into inner air flow 50 and outer air flow 52. The inner air flow 50 flows through inner bypass duct 44, the outer air flow 52 flows through outer bypass duct 46, and the inner air flow 50 flows into augmenter 28 through the diffuser liner 42.

As valve assembly 100 is moved towards position 304, the inner bypass cross-sectional area 150 is reduced to an inner bypass duct cross-sectional area 151 and outer bypass cross-sectional area 160 is reduced to an outer bypass duct cross-sectional area 161. Reducing cross-sectional areas 150, 160 of each duct 44, 46 reduces an amount of airflow that may be channeled through ducts 44, 46 and closes down the areas within the duct. Specifically, when valve assembly 100 is in second operational position 302, a substantial portion of fan bypass flow 48 is prevented from entering inner bypass duct 44 and/or outer bypass duct 46. As such, fan bypass flow 48 may be channeled to other outlets (not shown), such as, for example, roll post nozzles that facilitate vertical lift of the aircraft. The remaining fan bypass flow 48 is divided into inner air flow 50 and outer air flow 52. Inner air flow 50 is channeled through inner bypass duct 44 and outer air flow 52 is channeled through outer bypass duct 46. In the exemplary embodiment, the inner air flow 50 flows into augmenter 28 through diffuser liner 42.

At low power engine, cooling requirements are minimal as is the cooling flow 51 through the heat exchanger when inner air flow 50 flows into the augmenter 28 through the diffuser liner 42. At high power, the engine cooling requirements are substantially greater as is the cooling flow 51 through the heat exchanger such as during takeoff and vertical lift of the aircraft.

Figure 10:
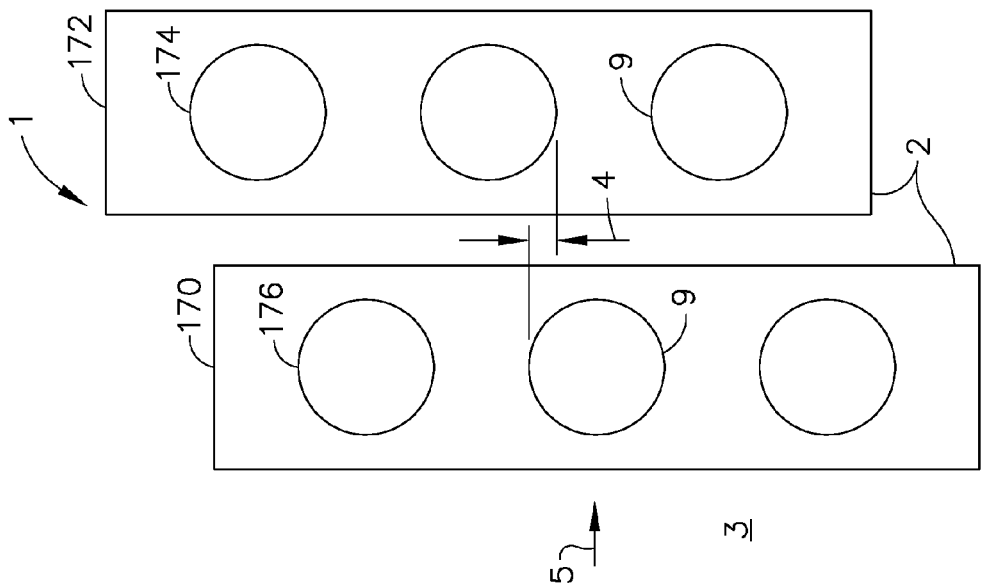
FIG. 10 is a radially inwardly looking planform schematic view illustration of the integrated variable geometry flow restrictor and heat exchanger system illustrated in FIG. 9 with the restrictor in a closed position.
Figure 9:
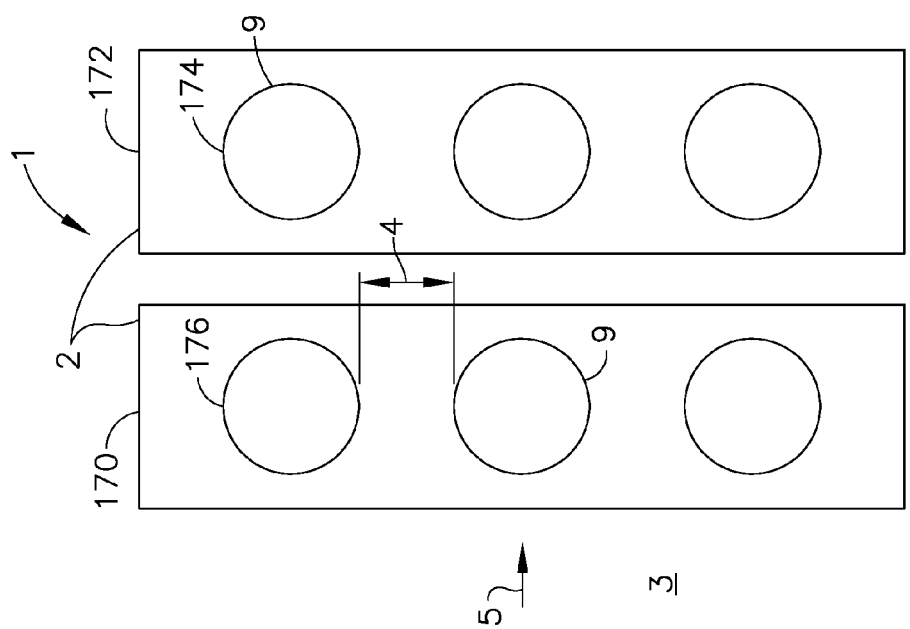
FIG. 9 is a radially inwardly looking planform schematic view illustration of an integrated variable geometry flow restrictor and heat exchanger system including upstream and downstream tube and fin heat exchangers that can rotate and/or translate axially with respect to each other in an open position.

Illustrated in FIGS. 9 and 10 is another exemplary integrated variable geometry flow restrictor and heat exchanger system 1 located in a fan bypass duct 3. The system includes annular upstream and downstream rows of tube and fin heat exchangers 170, 172 that can rotate and/or translate axially with respect to each other. The annular upstream and downstream rows of tube and fin heat exchangers 170, 172 include radially extending upstream and downstream heat transfer tubes 174, 176 respectively that serve as the variable geometry flow restrictor 2 for opening and closing a variable area 4 between the upstream and downstream heat transfer tubes 174, 176.

Though illustrated in a flat planform view herein the upstream and downstream rows of tube and fin heat exchangers 170, 172 are shaped in annular segments about the longitudinal centerline 11 similar to the view illustrated in FIG. 3. FIGS. 9 and 10 illustrate the variable geometry flow restrictor 2 in open and closed positions respectively.

Figure 11:
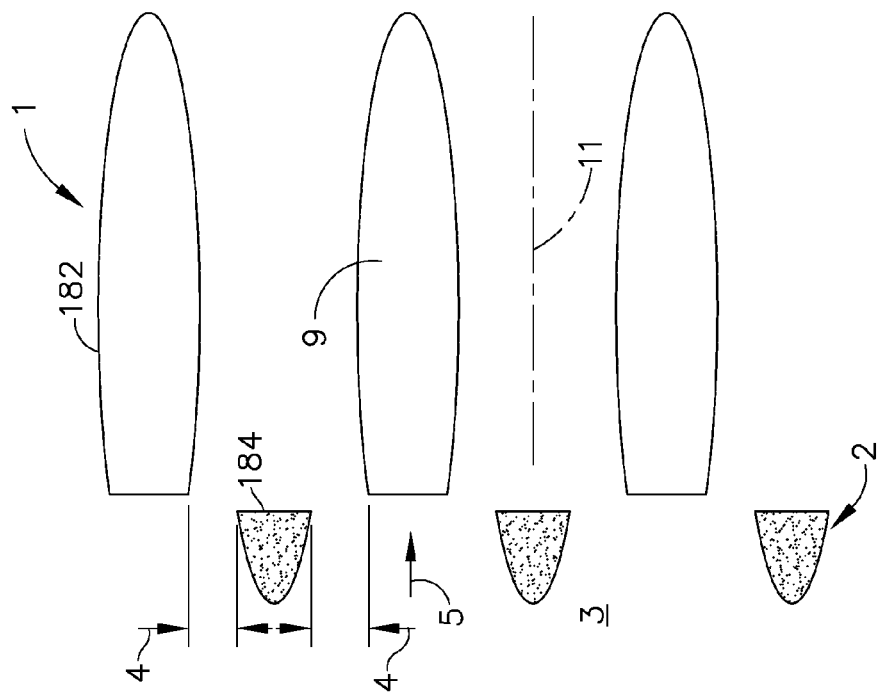
FIG. 11 is a radially inwardly looking planform schematic view illustration of an integrated variable geometry flow restrictor and heat exchanger system including hollow vanes with variable leading edge tips in an open position.
Figure 12:
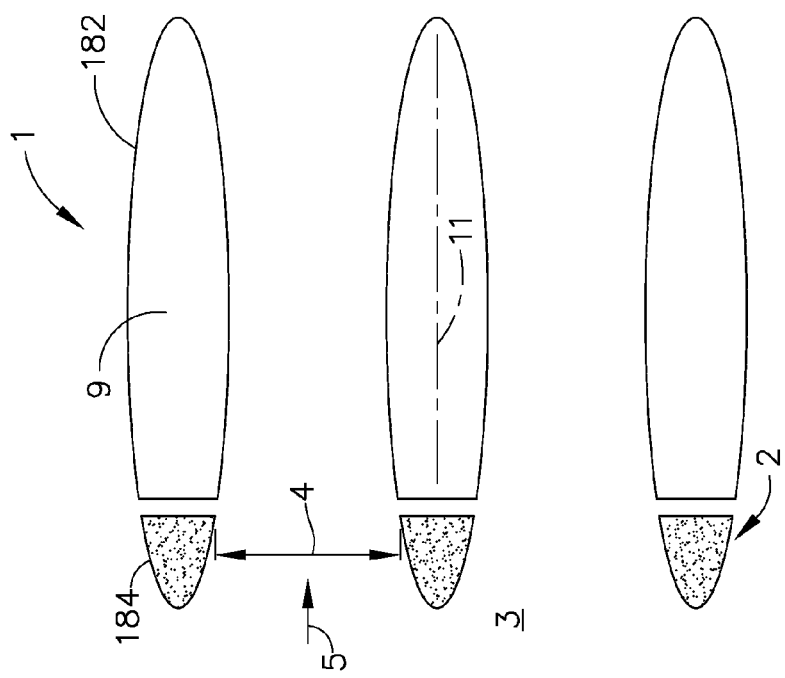
FIG. 12 is a radially inwardly looking planform schematic view illustration of the integrated variable geometry flow restrictor and heat exchanger system illustrated in FIG. 11 with the restrictor in a closed position.

Illustrated in FIGS. 11 and 12 is an exemplary integrated variable geometry flow restrictor and heat exchanger system 1 including an annular array 180 of hollow vanes 182 with variable leading edge tips 184 circumferentially disposed about the longitudinal centerline 11 of the fan bypass duct 3. The leading edge tips 184 are operably disposed in the fan bypass duct 3 for rotating about the longitudinal centerline 11 and with respect to the non-rotatable hollow vanes 182. The leading edge tips 184 serve as the variable geometry flow restrictor 2 for opening and closing a variable area 4 between adjacent hollow vanes. Cooling air is circulated through the hollow vanes 182 which serve as the heat exchanger. The hollow vanes 182 with variable leading edge tips 184 may be in annular segments about the longitudinal centerline 11 similar to the view illustrated in FIG. 3.

Figure 13:
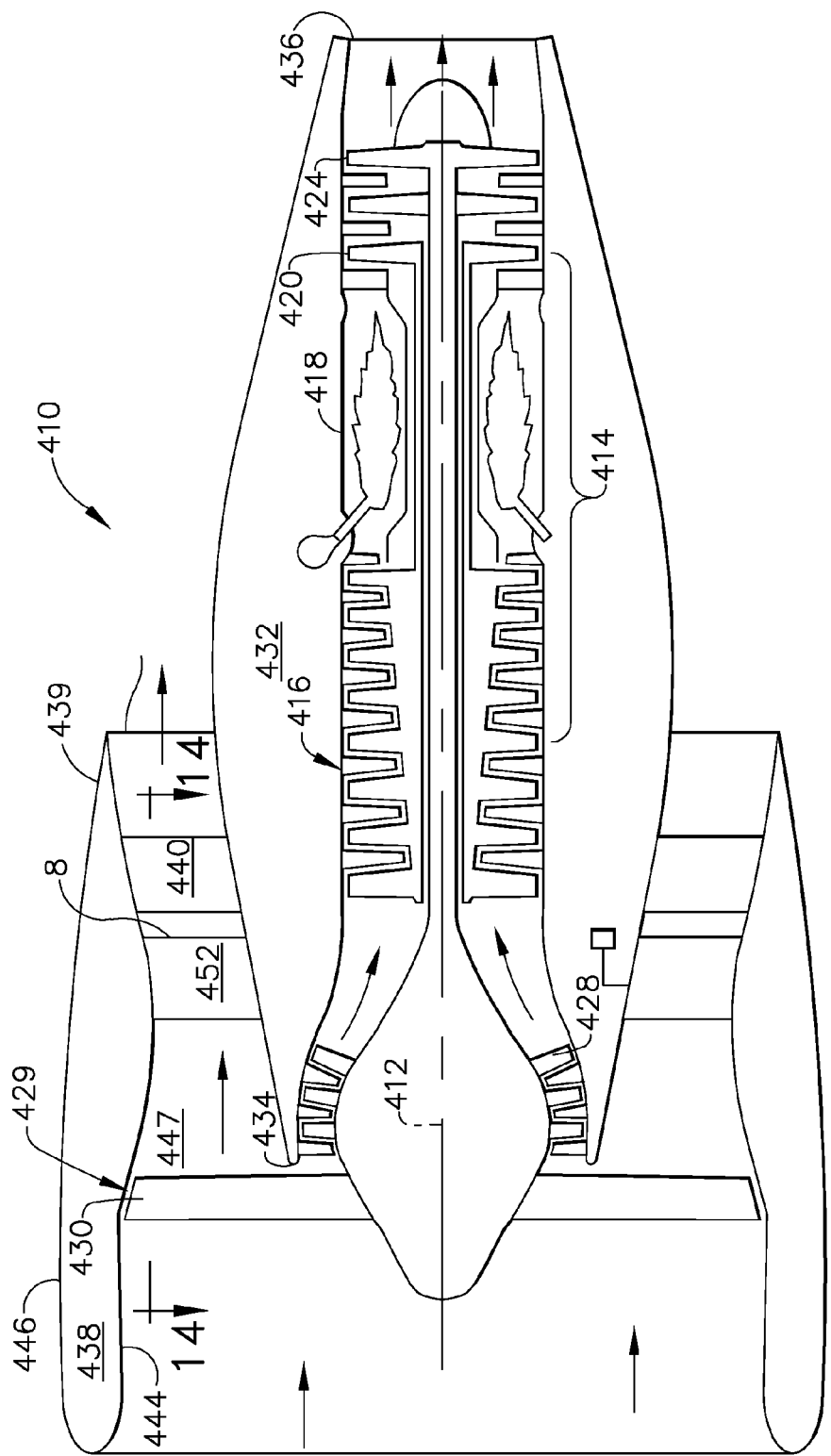
FIG. 13 is an axial sectional schematic view illustration of an exemplary high bypass turbofan engine with variable-pitch fan outlet guide vanes incorporating another exemplary embodiment of an integrated variable geometry flow restrictor and heat exchanger system.

Illustrated in FIG. 13 is an exemplary bypass turbofan gas turbine engine 410 having an engine centerline 412 and including a core engine 414 having a high pressure compressor 416, a combustor 418, and a high pressure turbine 420, all arranged in a serial axial flow relationship. A low pressure or power turbine 424 is downstream of and powered by the core engine 414 and drives an interconnected low pressure compressor 428 and a fan 429. The fan 429 includes a longitudinally aft-most row of generally radially outwardly extending fan blades 430.

The core engine 414, the low pressure turbine 424, and the low pressure compressor 428 are surrounded by a casing or core nacelle 432 disposed longitudinally aft and downstream of the fan blades 430. The core nacelle 432 includes a longitudinally forward end defining a flow splitter 434 and a longitudinally aft end defining a core exhaust nozzle 436. A fan nacelle 438 circumferentially surrounds the fan blades 430 and extends along at least a portion of the core nacelle 432. The fan nacelle 438 is supported about the core nacelle 432 by a plurality of support members such as fan frame struts 440. It is noted blades and vanes have cambered airfoil shapes while struts do not.

The fan nacelle 438 includes a fan nozzle 442, an inner exterior surface 444 facing generally radially inward, and an outer exterior surface 446 facing generally radially outward. An annular fan bypass duct 447 radially disposed between the fan nacelle 438 and the core nacelle 432 extends axially aftwardly or downstream from the flow splitter 434 to the fan nozzle 442. The fan nozzle 442 is located at a longitudinally aft end 439 of the fan bypass duct 447. An annular row of variable-pitch fan outlet guide vanes 452 is radially disposed across the fan bypass duct 447 between the fan and core nacelles 438, 432 and longitudinally aft of the flow splitter 434.

Figure 15:
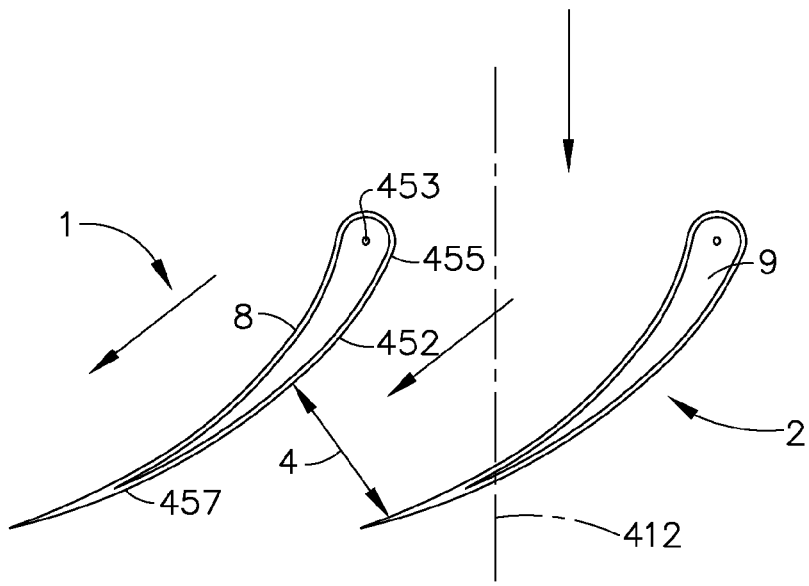
FIG. 15 is a radially inwardly looking planform schematic view illustration of the vanes in FIG. 13 in a closed position.
Figure 14:
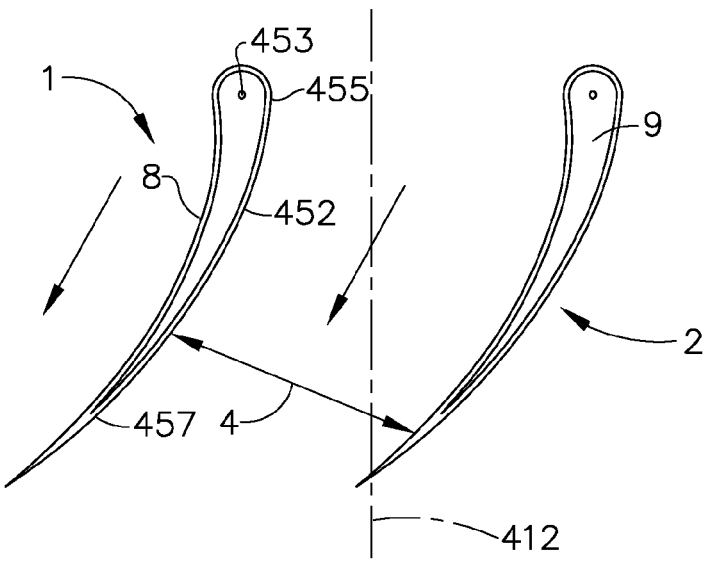
FIG. 14 is a radially inwardly looking planform schematic view illustration of the vanes in FIG. 13 in an open position.

The variable-pitch fan outlet guide vanes 452, as illustrated in FIGS. 14 and 15, are hollow and operable to pass cooling air therethrough so that the row of variable-pitch fan outlet guide vanes 452 serves as a heat exchanger 8. The variable-pitch fan outlet guide vanes 452 are illustrated herein as being pivotable about pivot axes 453 that are normal to the engine centerline 412. Alternatively, vane pitch could be varied by having only a vane leading edge 455 or a vane trailing edge 457 of the variable-pitch fan outlet guide vanes 452 being pivotable or by otherwise varying the effective angle of incidence of the vanes, as is known to those skilled in the art. Thus, the row of variable-pitch fan outlet guide vanes 452 also serves as a variable geometry flow restrictor 2 for opening and closing a variable area 4 between circumferentially adjacent variable-pitch fan outlet guide vanes 452. The row of hollow variable-pitch fan outlet guide vanes 452 serve as the integrated variable geometry flow restrictor and heat exchanger system 1. FIGS. 14 and 15 illustrate the integrated variable geometry flow restrictor 2 which are the hollow variable-pitch fan outlet guide vanes 452 in open and closed positions respectively.

Other types of variable-pitch vanes may also be used as the integrated variable geometry flow restrictor and heat exchanger system 1. For example a circumferential row of variable-pitch vanes 462 used in the high pressure compressor 20 of engine 10 illustrated in FIG. 6 could also be hollow and constructed to serve as a heat exchanger 8 and variable geometry flow restrictor 2. The variable-pitch vanes 462 extend radially across a high pressure compressor flowpath 464 in a core engine duct 466 of the core engine which includes the high pressure compressor 20. A circumferential row of hollow variable-pitch vanes may also be used in the low pressure compressor 428 of engine 10 illustrated in FIG. 13. The variable-pitch vanes could also be hollow and constructed to serve as a heat exchanger 8 and variable geometry flow restrictor 2 in the low pressure compressor 428.

Figure 16:
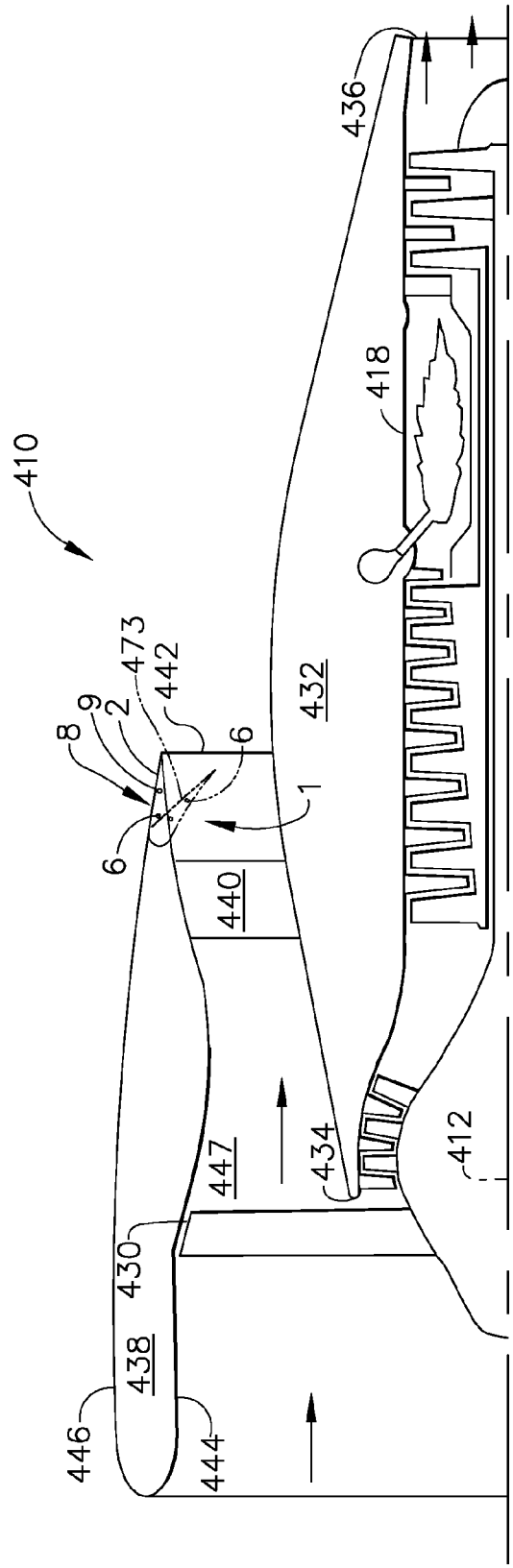
FIG. 16 is an axial sectional schematic view illustration of an exemplary high bypass turbofan engine with a fan nozzle including pivotal flaps incorporating another exemplary embodiment of an integrated variable geometry flow restrictor and heat exchanger system.

Illustrated in FIG. 16 is an exemplary bypass turbofan gas turbine engine 410 disposed about an engine centerline 412 similar to the engine illustrated in FIG. 13 without the variable-pitch fan outlet guide vanes. A fan nacelle 438 circumferentially surrounds the fan blades 430 and extends along at least a portion of a core nacelle 432. The fan nacelle 438 is supported about the core nacelle 432 by a plurality of support members such as fan frame struts 440.

A variable area fan nozzle 442 is located at a longitudinally aft end of the fan nacelle 438. The fan nacelle 438 has an inner exterior surface 444 facing generally radially inward and an outer exterior surface 446 facing generally radially outward. An annular fan bypass duct 447 radially disposed between the fan nacelle 438 and the core nacelle 432 extends axially aftwardly or downstream from a flow splitter 434 to the fan nozzle 442.

The fan nozzle 442 includes a circumferential row of pivotal flaps 473 disposed at an aft end of the fan nacelle 438 or bypass duct 447. One or more of the pivotal flaps 473 carry the heat exchanger heat transfer tubes 6 and, thus, serve as a heat exchanger 8. The pivotal flaps 473 also serves as a variable geometry flow restrictor 2 for opening and closing a the variable area nozzle 442. The combination of the heat exchanger heat transfer tubes 6 and the pivotal flaps 473 serve as the integrated variable geometry flow restrictor and heat exchanger system 1 for the engine 10 illustrated in FIG. 16. The integrated variable geometry flow restrictor 2 which is the variable area nozzle 442 are illustrated in an open position in solid line and closed position in phantom line in FIG. 16 respectively.

Figure 17:
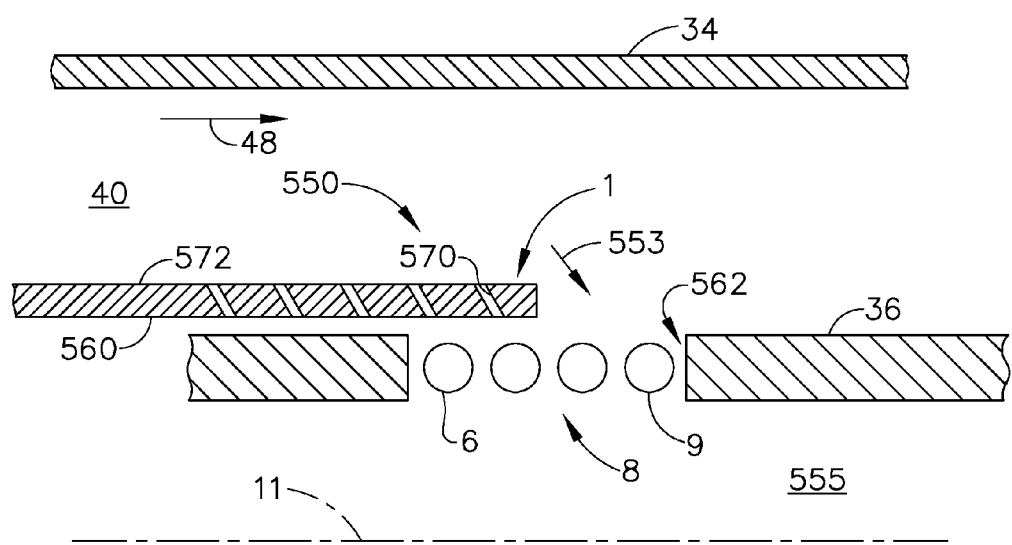
FIG. 17 is an axial sectional schematic view illustration of an integrated variable geometry flow restrictor and heat exchanger system having heat transfer tubes in an outlet of a rear variable area bypass injector.

Illustrated in FIG. 17 is an exemplary rear variable area mixing device or variable area bypass injector (VABI) 550 which is designed for use in a variable cycle engine such as engine 10 illustrated in FIG. 6. The (VABI) 550 illustrated herein is designed to selectively open and close and/or selectively flow an injection portion 553 of fan bypass flow 48 from a bypass duct 40 into an exhaust flow path 555 radially surrounded by an inner casing 36. The (VABI) 550 illustrated herein is designed to be disposed axially between the low pressure turbine (LPT) 26 and the augmentor 28 or the variable area exhaust nozzle 29 in an engine similar to the engine 10 illustrated in FIG. 6. The bypass duct 40 is defined between outer and inner casings 34, 36.

The (VABI) 550 illustrated herein is yet another exemplary integrated variable geometry flow restrictor and heat exchanger system 1 which includes a slider valve 560 operable to selectively cover one or more openings 562 in the inner casing 36. The slider valve 560 and the openings 562 are circumferentially disposed about a longitudinal centerline 11 about which the fan bypass duct 40 is circumscribed. The integrated variable geometry flow restrictor and heat exchanger system 1 further includes one or more heat transfer tubes 6 disposed in each of the openings 562. The slider valve 560 further includes impingement holes 570 (or alternatively slots) aimed to direct the injection portion 553 of the fan bypass flow 48 to impinge directly onto the heat transfer tubes 6 when the slider valve 560 is closed. The slider valve 560 is illustrated herein as being an axially translatable annular sleeve 572 with the impingement holes 570 disposed therethrough and radially located just outside of the inner casing 36 but, alternatively, may be rotatable.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. An integrated variable geometry flow restrictor and heat exchanger system comprising:
one or more heat exchangers mounted in a duct,
heat transfer cooling passages in each of the heat exchangers,
a variable geometry flow restrictor integral or associated with each of the one or more heat exchangers,
the flow restrictor operable to open and close or vary a variable area bounded at least in part by the heat exchanger and duct,
the variable area located between the heat exchangers and one of inner and outer casings bounding the duct, and
an annular slide valve axially translatable within the duct and with respect to the heat exchanger and operable to open and close or vary the variable area.

2. A system as claimed in claim 1 further comprising the heat exchangers mounted to one of the inner and outer casings.

3. A system as claimed in claim 2 further comprising the duct being annular and circumscribed about a longitudinal centerline and the heat exchangers being circumferentially distributed around the duct.

4. A system as claimed in claim 3 further comprising circumferentially curved heat transfer tubes or vanes in the heat exchangers.

5. A system as claimed in claim 3 further comprising radial heat transfer tubes or vanes in the heat exchangers.

6. A gas turbine engine comprising:
a longitudinal centerline about which the engine is circumscribed,
an annular inlet followed in axial downstream flow relationship by a fan assembly, a high pressure compressor, a combustor, a high pressure turbine, and a low pressure turbine,
an outer casing radially spaced apart from an inner casing defining a bypass duct therebetween,
the bypass duct located around and radially outwardly of the high pressure compressor, the combustor, the high pressure turbine, and the low pressure turbine,
an integrated variable geometry flow restrictor and heat exchanger system including one or more heat exchangers mounted in the duct and a variable geometry flow restrictor integral or associated with the one or more heat exchangers, and
heat transfer cooling passages in each of the heat exchangers, and
a variable area between the heat exchanger and one of inner and outer casings bounding the bypass duct and an annular slide valve axially translatable within the bypass duct and with respect to the heat exchanger and operable to open and close or vary the variable area.

7. A gas turbine engine as claimed in claim 6 further comprising the heat exchangers mounted to one of the inner and outer casings.

8. A gas turbine engine as claimed in claim 7 further comprising the heat exchangers circumferentially distributed around the duct and circumferentially curved heat transfer tubes or circumferentially curved vanes in the heat exchangers or radial heat transfer tubes or radial vanes in the heat exchangers.

* * * * *